US007730468B1

(12) United States Patent
Trowbridge

(10) Patent No.: US 7,730,468 B1
(45) Date of Patent: Jun. 1, 2010

(54) SYSTEM AND METHOD PROVIDING ON-DEMAND GENERATION OF SPECIALIZED EXECUTABLES

(76) Inventor: Sean E. Trowbridge, 3032 206th Way NE., Redmond, WA (US) 98053

( * ) Notice: Subject to any disclaimer, the term of this patent is extended or adjusted under 35 U.S.C. 154(b) by 964 days.

(21) Appl. No.: 09/817,880

(22) Filed: Mar. 26, 2001

(51) Int. Cl.
*G06F 9/45* (2006.01)
*G06F 9/44* (2006.01)
(52) U.S. Cl. .................. 717/148; 717/139; 717/167
(58) Field of Classification Search .......... 717/106, 717/146–148, 151, 154, 168–178
See application file for complete search history.

(56) References Cited

U.S. PATENT DOCUMENTS

| 5,761,512 | A | * | 6/1998 | Breslau et al. ............... 717/140 |
| 5,850,511 | A | * | 12/1998 | Stoecker et al. ............... 714/38 |
| 6,078,744 | A | | 6/2000 | Wolczko et al. ............ 395/705 |
| 6,126,330 | A | * | 10/2000 | Knight ....................... 717/127 |
| 6,158,049 | A | * | 12/2000 | Goodwin et al. ............ 717/158 |
| 6,253,257 | B1 | * | 6/2001 | Dundon ....................... 719/331 |
| 6,253,368 | B1 | * | 6/2001 | Nelin et al. .................. 717/124 |
| 6,457,122 | B1 | * | 9/2002 | Ramezani ....................... 713/1 |
| 6,519,762 | B1 | * | 2/2003 | Colligan et al. ............. 717/170 |
| 6,571,389 | B1 | * | 5/2003 | Spyker et al. ............... 717/176 |
| 6,721,946 | B1 | * | 4/2004 | Fogarty et al. .............. 717/175 |
| 6,842,897 | B1 | * | 1/2005 | Beadle et al. .................. 718/1 |

OTHER PUBLICATIONS

Aho, Sethi, and Ullman, "Compilers: Principles, Techniques, and Tools", 1986, Addison-Wesley, ISBN 0-201-10088-6, Chapter 1.*
Armstrong, "HotSpot: A new breed of virtual machine", Mar. 1998, JavaWorld, website: <www.javaworld.com>, accessed and printed on Aug. 19, 2005, 11 pages.*

* cited by examiner

*Primary Examiner*—James Rutten
(74) *Attorney, Agent, or Firm*—Workman Nydegger

(57) ABSTRACT

A system and method is provided for generating and executing specialized code executables. The system includes a virtual subsystem that processes a generic code image and logs information relating to an operating environment of the virtual subsystem. The logged information is employed as feedback to generate a specialized native executable, wherein the specialized native executable is utilized to provide improved performance of the virtual subsystem. The specialized native executable is selected for execution by the virtual subsystem by matching a current operating environment setting with the logged information.

11 Claims, 8 Drawing Sheets

SYSTEM AND METHOD PROVIDING ON-DEMAND GENERATION OF SPECIALIZED EXECUTABLES

TECHNICAL FIELD

The present invention relates generally to computer systems, and more particularly to a system and method to facilitate selection and generation of an optimized executable image in a virtual execution environment. If a suitable image is not selected, feedback from the virtual environment is employed to enable generation of a more specialized executable image.

BACKGROUND OF THE INVENTION

Computer systems are driven by machine-readable instructions encoded in binary format, wherein the encoding depends on the hardware platform executing the instructions, and ultimately, according to an instruction set of a platform processor. Humans, however, often design programs according to human understandable/readable computer instructions in the form of source code, wherein compilers, or other tools such as assemblers, convert the source code into machine-readable instructions. These tools have steadily increased in performance and sophistication as technology has advanced. As one example, a standard native or static compiler generally inputs all available source code for a particular program and generates an executable image of instructions for a particular hardware platform. As program sizes and the amount of source code increases, however, the time to compile large code sources can become excessive. Thus, costs associated with developing large programs can increase as the size of the program increases for no other reason than time is expended waiting for the compiler to complete or build executable code images. This problem can be exacerbated when a small change in a source program requires a re-compilation of some, if not all portions of the entire source program.

Another issue relating to static compilers is that a separate compiler and subsequent compilation process may be required for each hardware platform that a particular source program is to be executed on. Thus, a program written in C++ to be operated on a desktop personal computer would likely be re-compiled by a different compiler in order to operate in a workstation UNIX environment, for example. In order to address compile time and re-compilation issues, other types of compilers and execution models have been developed. As an example, intermediate language compilers have been developed that convert source code written in many different languages (e.g., C++, BASIC, Pascal) to an intermediate language that operates in a virtual environment sometimes referred to as a virtual machine. This provides a layer of abstraction to the source code that enables a single code source to execute on multiple hardware platforms and operating environments. Thus, the virtual machine converts the intermediate language into the particular instructions required of the platform. Although platform independence and reduced development time is generally achieved by this model, some program performance is sacrificed when converting the intermediate language to machine-dependent instructions. Thus, a tradeoff exists between higher performance program operations provided by standard native compilers and the compilation and development time benefits provided by intermediate language systems. Consequently, there is a need for a system and methodology to provide program performance approaching that of native compiled systems while also providing the development benefits of intermediate language systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method to facilitate improved generation and performance of an executable image. A system and methodology bridges competing requirements associated with providing a general, platform-neutral and late-bound executable image format and providing image execution performance approaching that of standard native compiled programs. One or more specialized versions of an executable image are created and stored with an associated description of the image's execution environment. The specialized versions of the executable image represent optimizations of a more generalized image. Analysis and subsequent creation of the specialized version from the more generalized image is front-loaded to occur at substantially non-critical times of an overall code execution, generation and optimization process. In this manner, improved code optimizations are achieved while mitigating performance penalties relating to code analysis and optimization at system runtime.

More particularly, the present invention stores and/or caches possible executable images associated with at least one operating environment in a repository, such as an image database. A loader searches the repository for a possible executable image at run time in a virtual execution environment. If the loader finds a suitable image, the image is loaded and executed by a virtual code execution engine. If a suitable image is not found by the loader, a logging component logs information about the current execution environment according to the operating conditions of the execution engine. The logged information is provided as feedback and analyzed either manually and/or automatically to generate a new and/or specialized executable image that may then be stored in the repository and utilized in future operations of the execution engine. The specialized image generally provides higher performance operations within a virtual system in contrast to generating native code anew from a generic intermediate language according to operating environment differences. Analysis for generating the specialized executable may include operating environment considerations such as hardware configurations, operating system versions, processor architectures and configurations, component versions, developer parameters, domain determinations, security considerations, along with a plurality of other factors.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides a system and methodology to utilize a late-bound, platform-neutral executable format within a processing architecture while providing flexible operational modes adaptable by the processing architecture to enable system execution performance to approach that of native and/or static compiled programs. This is achieved by enabling the processing architecture to select from one or more modes of code and/or image execution. For example, a first mode of execution provides a late-bound virtual language system that can utilize a more generic executable image in order to operate in substantially all execution environments. Another mode of operation provides for dynamic selection, adjustment, adaptability and configurability of one or more specialized execution images that represent optimized instances of a particular operating environment. In this manner, new operational environments can be adapted to while increasing overall operational performance according to a plurality of diverse system configurations.

Figure 1:
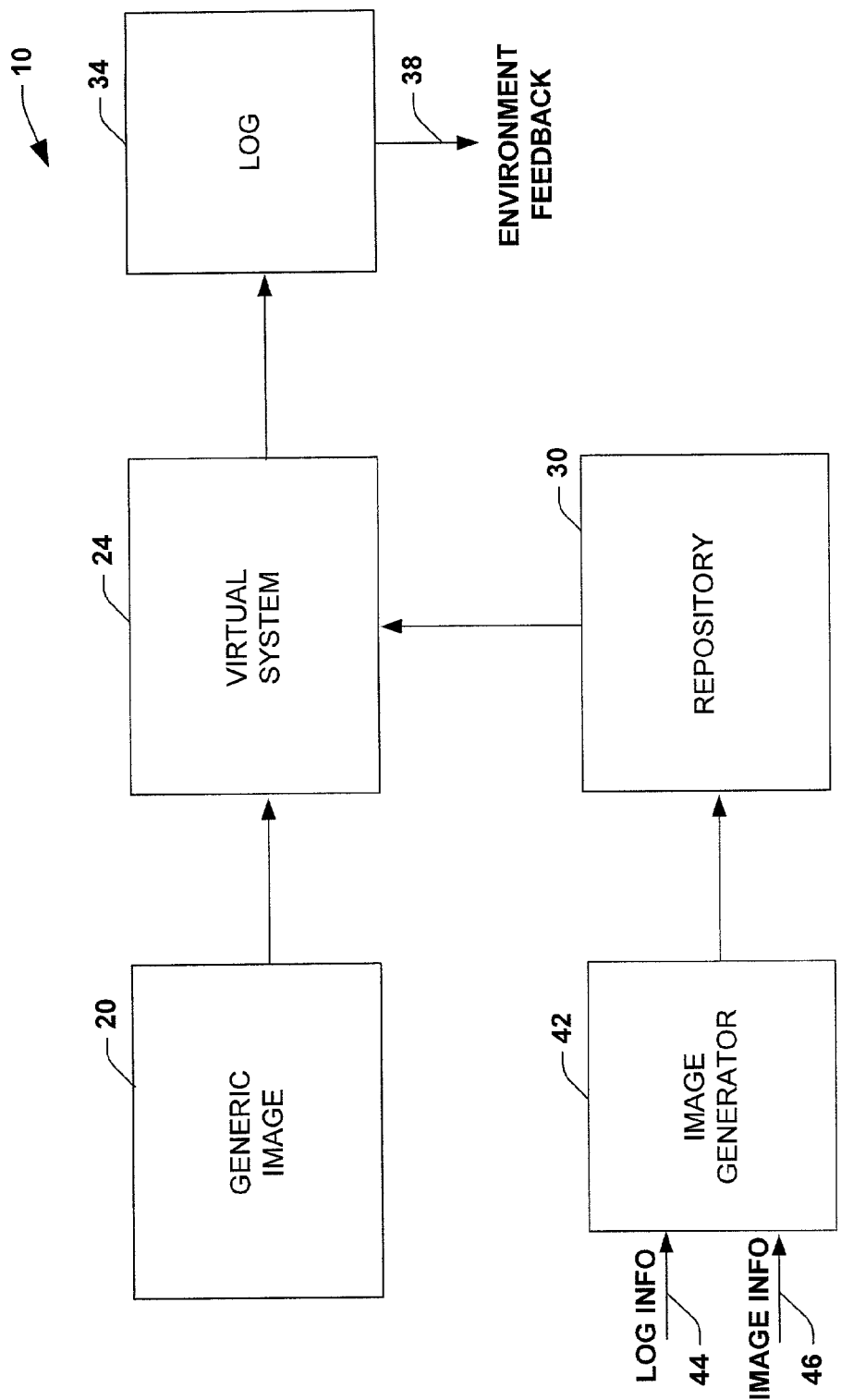
FIG. 1 is a schematic block diagram illustrating a system providing on-demand generation and execution of specialized executables in accordance with an aspect of the present invention.

Referring initially to FIG. 1, a system 10 illustrates on-demand generation and execution of specialized executables in accordance with an aspect of the present invention. The system 10 provides a dynamic and flexible code execution environment, wherein a more general or generic image 20 can be executed according to various environment configurations (e.g., processor type, platform differences) of a virtual system 24 and provide generation and selection of a more specialized and/or optimized image (not shown) from a repository 30 of one or more specialized images which are described in more detail below. The generic image 20, which can be a platform-neutral intermediate language, for example, is processed by the virtual system 24 via an execution model such as a Just-In-Time compilation of the generic image 20. It is to be appreciated that substantially any execution model may be utilized in accordance with the present invention.

The present invention provides for the generation and subsequent execution of a "specialized" and/or more optimized native image to enable higher execution performance of the system 10 according to various runtime environments. This may be achieved by logging one or more aspects of the virtual system operating environment in a log 34 along with the particular native image associated with the environment. These aspects may be employed as feedback 38 to enable generation of the more specialized and/or optimized executable. For example, an image generator 42, which can include a compiler and/or other type of code processor, may receive manually and/or automatically generated log information 44 and native image information 46 derived from the environment feedback 38. The image generator 42 then generates the specialized image adapted to a particular operating environment and stores the image in the repository 30 for later execution by the virtual system 24.

When the virtual system 24 begins execution, it searches the repository 30 for an existing specialized version of the generic image 20 that is suitable for the existing operating and/or runtime environment. If a suitable specialized image is found that matches the existing environment, the specialized image is loaded from the repository 30 and executed in lieu of the generic image 20 by the virtual system 24. In this manner, system performance is increased since the specialized native image enables the virtual system 24 to execute platform instructions without interpretation and/or further processing/compilation of the generic image 20. The present invention may further be generalized to increase the set of information associated with the virtual system environment. For example, this may include specializing images according a particular user, a method of invocation, and/or according to an observed usage pattern captured within the log 34. As an example, one such pattern may include the number of times within a certain period that a particular image has been loaded and executed. Moreover, program profile information can be captured that may include a class use or a code execution usage as part of the log 34. This information may also be fed back from the log 34 to generate more efficient executables.

Figure 2:
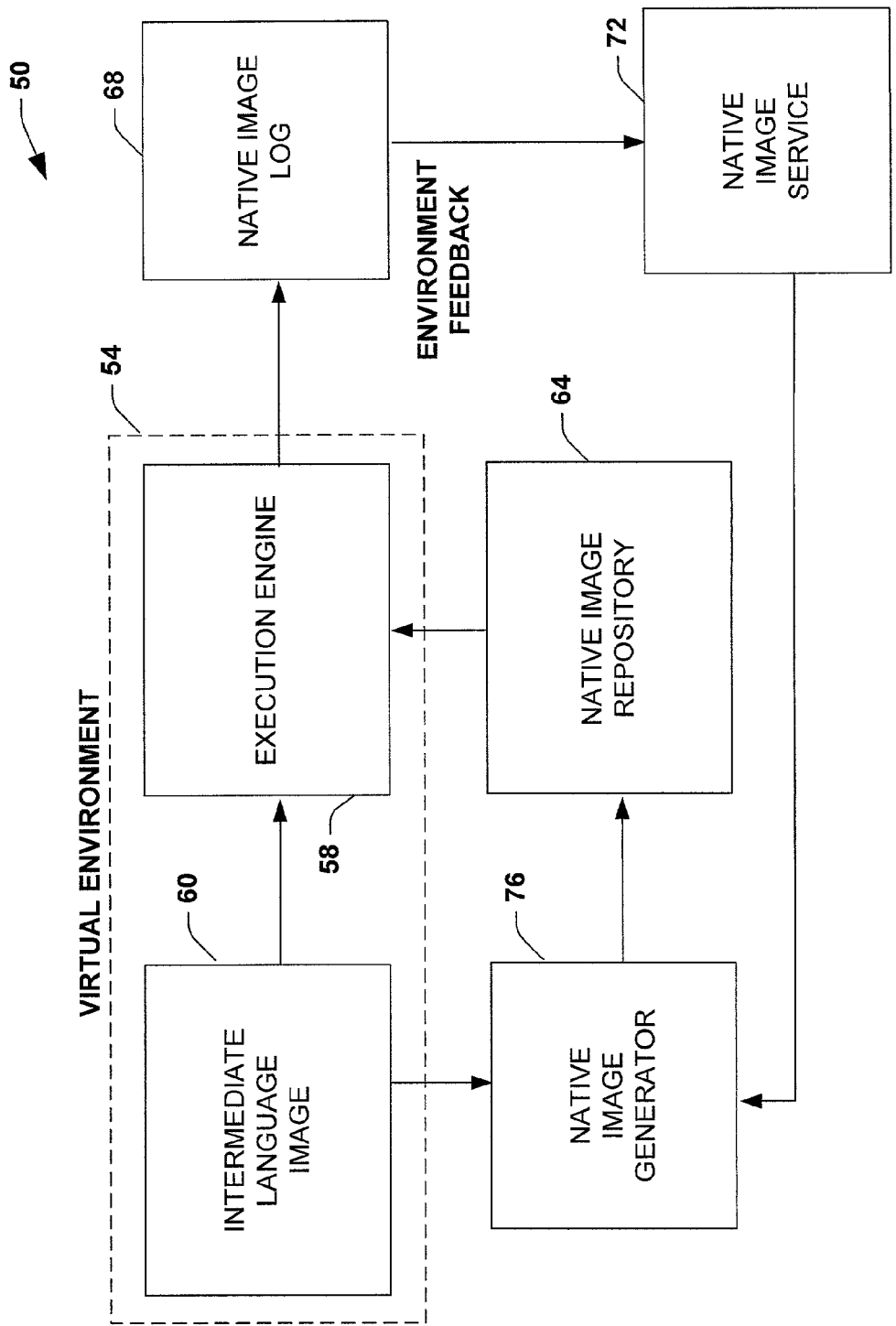
FIG. 2 is a schematic block diagram illustrating an exemplary system utilizing execution environment feedback to generate specialized executables in accordance with an aspect of the present invention.

Referring now to FIG. 2, an exemplary system 50 illustrates utilizing execution environment feedback to generate specialized executables in accordance with an aspect of the present invention. The system 50 includes a virtual operating environment 54 providing an execution engine 58 that inputs an intermediate language image 60. The intermediate language (IL) 60 may include substantially any type of an executable image operable by the execution engine 58. For example, the execution engine 58 may operate as a virtual machine or component that interprets the IL 60 and generates native code executables for the platform in which the virtual environment 54 is located and/or executes. Before the IL image 60 is executed however, the execution engine 58 searches a native image repository 64 for an optimized native image that matches the runtime characteristics of the virtual environment 54. For example, the native images may be stored with a tag or label indicating environment characteristics for which the native image is valid. The execution engine 58 compares the identifier with the current virtual environment 54 to determine if a match has occurred within the native image repository 64. If a match has not occurred, the IL image 60 is processed according to a Just-In-Time compilation, for example, wherein IL code segments within the image are processed and subsequently executed by the execution engine 58.

The native image repository 64, which can be a local or remote database for example, can store a plurality of native images that are configured to run according to environment variables affecting the operation of the execution engine 58. These variables, which are described in more detail below in relation to FIG. 6, can include platform parameters that affect how a particular source image is configured and processed in regard to the operational native code generation of the platform. For example, a different operating system version (e.g., newer vs. older version) may cause the execution engine to produce different versions of compiled or processed IL image code. Rather than generating native platform code from a generic IL image each time a new environment is encountered and/or environment variable changes, the present invention builds a plurality of specialized native images within the native image repository 64 having various operational environment characteristics. During future operations of the execution engine 58, if previously built and configured native code is detected in the native image repository 64, the previously built native image can be retrieved from the repository and executed in native form—substantially without any further compilations or IL processing by the execution engine 58. In this manner, the system 50 can provide operational performance approaching that of static native compiled systems.

The specialized images within the native image repository 64 are generated by adapting the execution engine 58 to log virtual environment information into a native image log 68 when processing the IL image 60. The native image log 68 records images that are encountered during processing of the execution engine 58. Along with the recorded images, environment variables, described below, are updated to reflect the operating characteristics of the associated image. A native image service 72, which may be an automatic service and/or a user-driven mechanism and can be operated as a separate processing unit or operating component, reads the environment and associated image data from the log 68 and invokes a native image generator 76 to generate a specialized native image according to the environment information contained within the log. The native image generator 76 processes an IL image 60 along with the environment information provided by the native image service 72 to generate a specialized native executable in the native image repository 64. This process may be repeated, wherein other specialized executables are generated, for other environment descriptions. If the execution engine 58 detects a similar operating environment during future operations, a matching specialized executable can be selected and executed from the repository 64.

Figure 3:
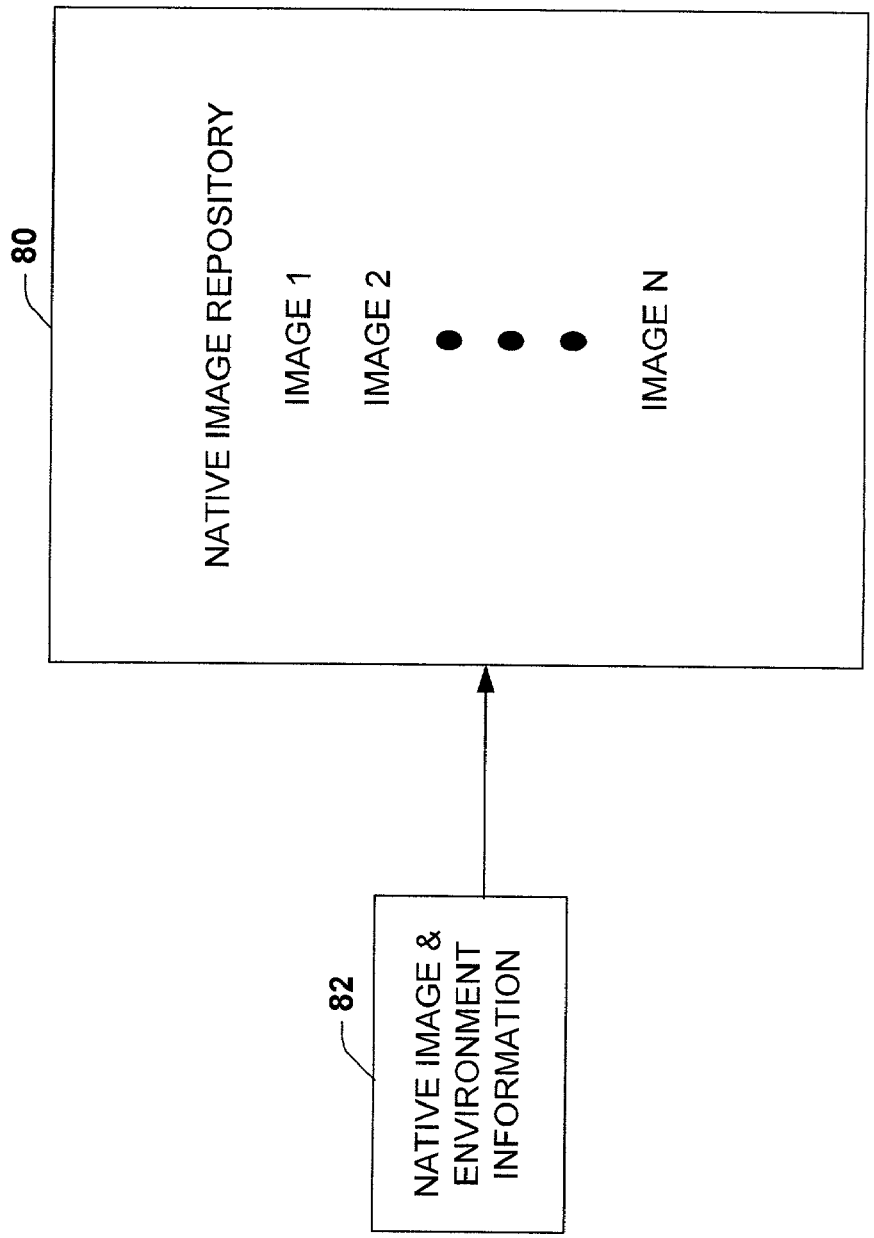
FIG. 3 is a schematic block diagram illustrating an image repository in accordance with an aspect of the present invention.

Turning now to FIG. 3, an image repository 80 is illustrated in accordance with an aspect of the present invention. As described above, the image repository 80 can be a local or remote networked system having a database or other storage capabilities to store specialized executable native images 82 configured with related environment characteristics. The image repository can be a separate processing unit that reads the images 82 from the native image generator described above and/or can act as a data store for images that are stored by the native image generator. As illustrated, 1 through N native images may be stored in the image repository 80, wherein N is an integer. Images may be stored in substantially any order, however, the images are stored with an identifier or other information (e.g., header field configured with associated environment settings) indicating the environment characteristics for which the images were generated. Thus, images are retrieved by an execution engine based upon the current operating environment of the execution engine being matched with the identifier associated with a selected image.

Figure 4:
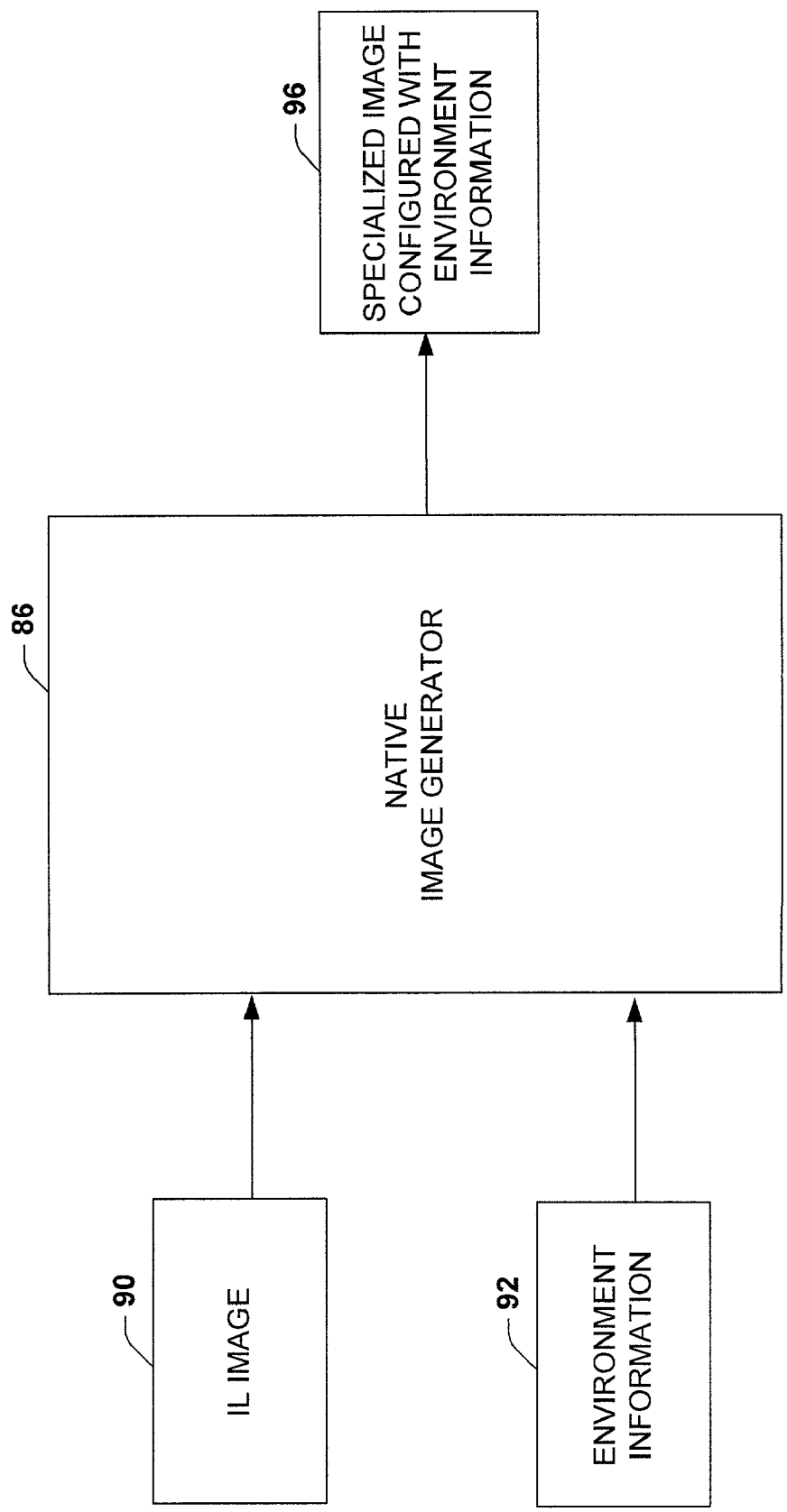
FIG. 4 is a schematic block diagram illustrating an image generator in accordance with an aspect of the present invention.

Referring now to FIG. 4, an image generator 86 is illustrated in accordance with an aspect of the present invention. The image generator receives a generic IL image 90 with an associated set of environment information 92 (e.g., environment parameters, settings) relating to a current runtime configuration of a virtual operating environment. Environmental information 92 is analyzed by the image generator 86 and employed to adjust generic settings within the IL image 90. For example, the IL image 90 may be compiled and/or processed according to N environmental parameters (N being an integer), wherein each of the N parameters can cause a different specialized native image 96 to be generated. The image generator 86 thus configures the IL image with specific runtime environment information 92, and compiles, processes, and/or generates the specialized image 96 while incorporating the specifics of the environment information 92. In this manner, specialized native images 96 can be generated that are associated with a particular environment. Consequently, future operations of an execution engine can utilize native code tailored for a particular environment generally without having to further process IL code. Thus, system runtime performance is improved.

Figure 5:
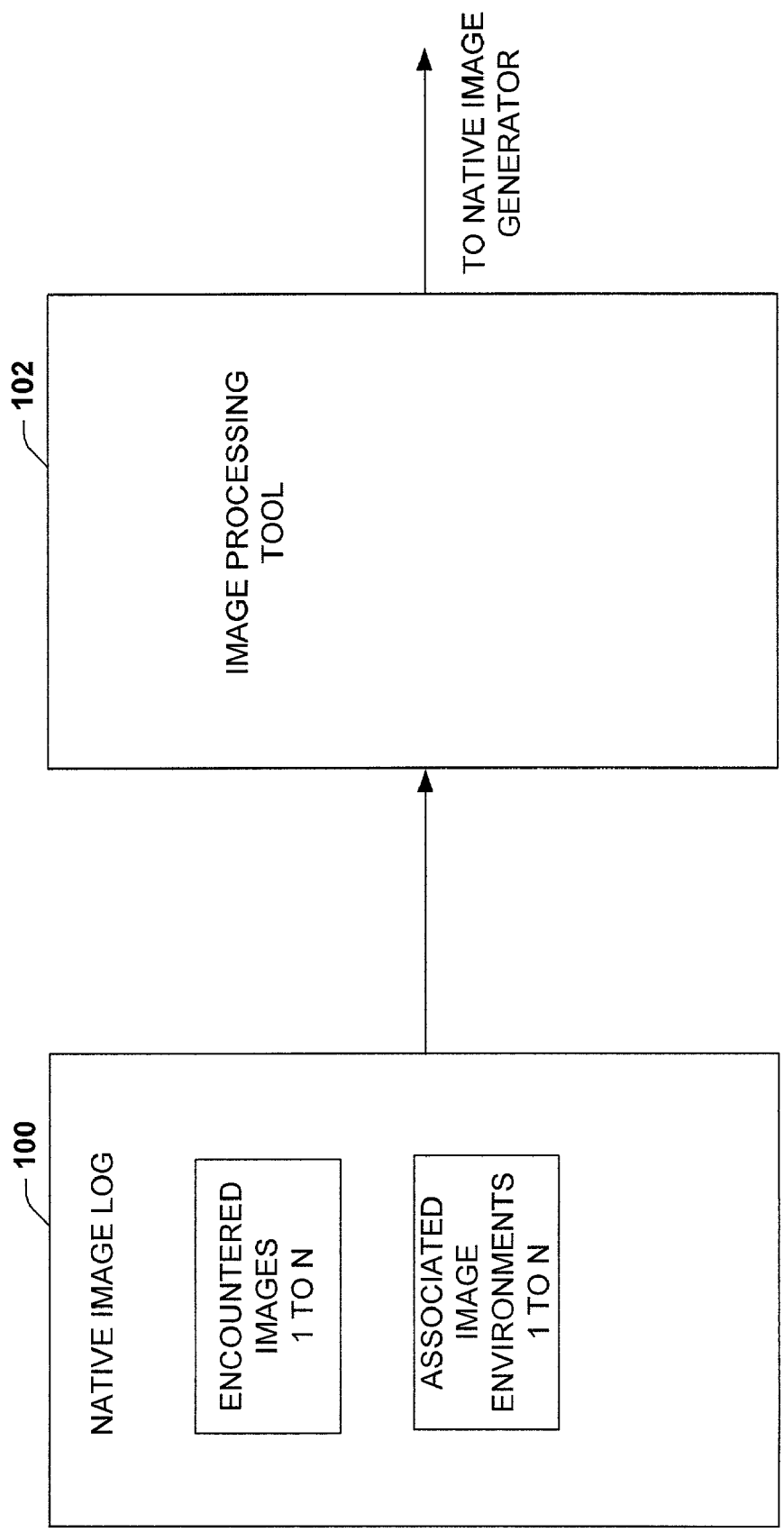
FIG. 5 is a schematic block diagram illustrating an image log and processing tool in accordance with an aspect of the present invention.

Referring now to FIG. 5, an image log 100 and processing tool 102 is illustrated in accordance with an aspect of the present invention. As illustrated, the image log 100 can store from 1 to N encountered images from an execution engine, and store from 1 to N associated image environments encountered during execution, wherein N represents an integer. The image processing tool 102, which can be a native image service as described above, reads the encountered images and determines a parameter set of environment variables associated with a particular encountered image. The determination may involve setting flags or other indications that can be read by the native image generator indicating which source fields or data declarations in a generic IL image are to be adjusted with updated environment information. A native image generator can then utilize the associated environmental information and flags to generate a specialized native image.

Figure 6:
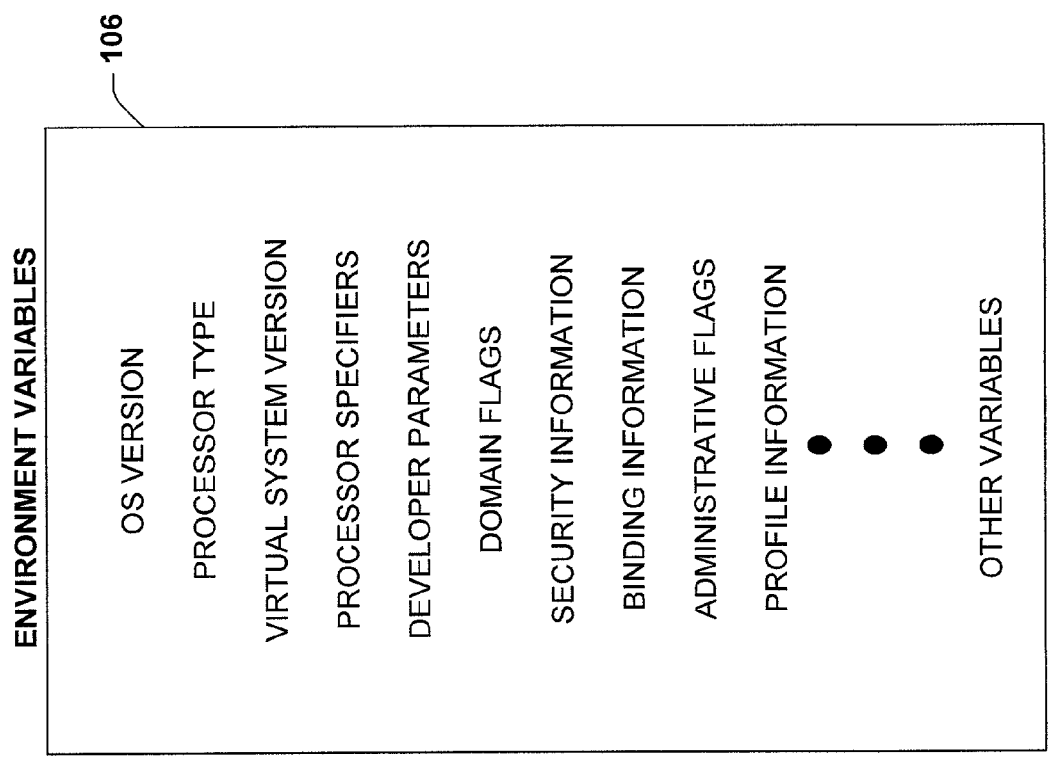
FIG. 6 is a diagram illustrating exemplary execution environment variables in accordance with an aspect of the present invention.

Turning now to FIG. 6, an exemplary table of execution environment variables 106 is illustrated in accordance with an aspect of the present invention. A plurality of operating environment descriptive information may be updated and described by the environment variables 106. For example, these variables may include an operating system version and processor type information (e.g., Windows/Unix OS, Pentium vs. Pentium III). Other variables may include virtual system version information, processor specifiers, and developer information. For example, the developer information may include settings related to debug options, compiler switch settings and user profiling information relating to preferences of a particular user. Domain flags may be provided that indicate whether an operating domain is domain neutral or domain specific along with architecture specific flags relating to the domain. Security information may be provided indicating particular security policies and/or other security restrictions in effect for a particular environment. Binding Information variables or flags can be provided indicating that other modules or assemblies have been compiled. Administrative flags may be provided indicating system administrator settings in effect that may also include virtual environment executable parameters. Still yet another variable may include profile information relating to a particular program associated with an encountered image. It is to be appreciated that other variables may be included to further define the execution environment.

Figure 7:
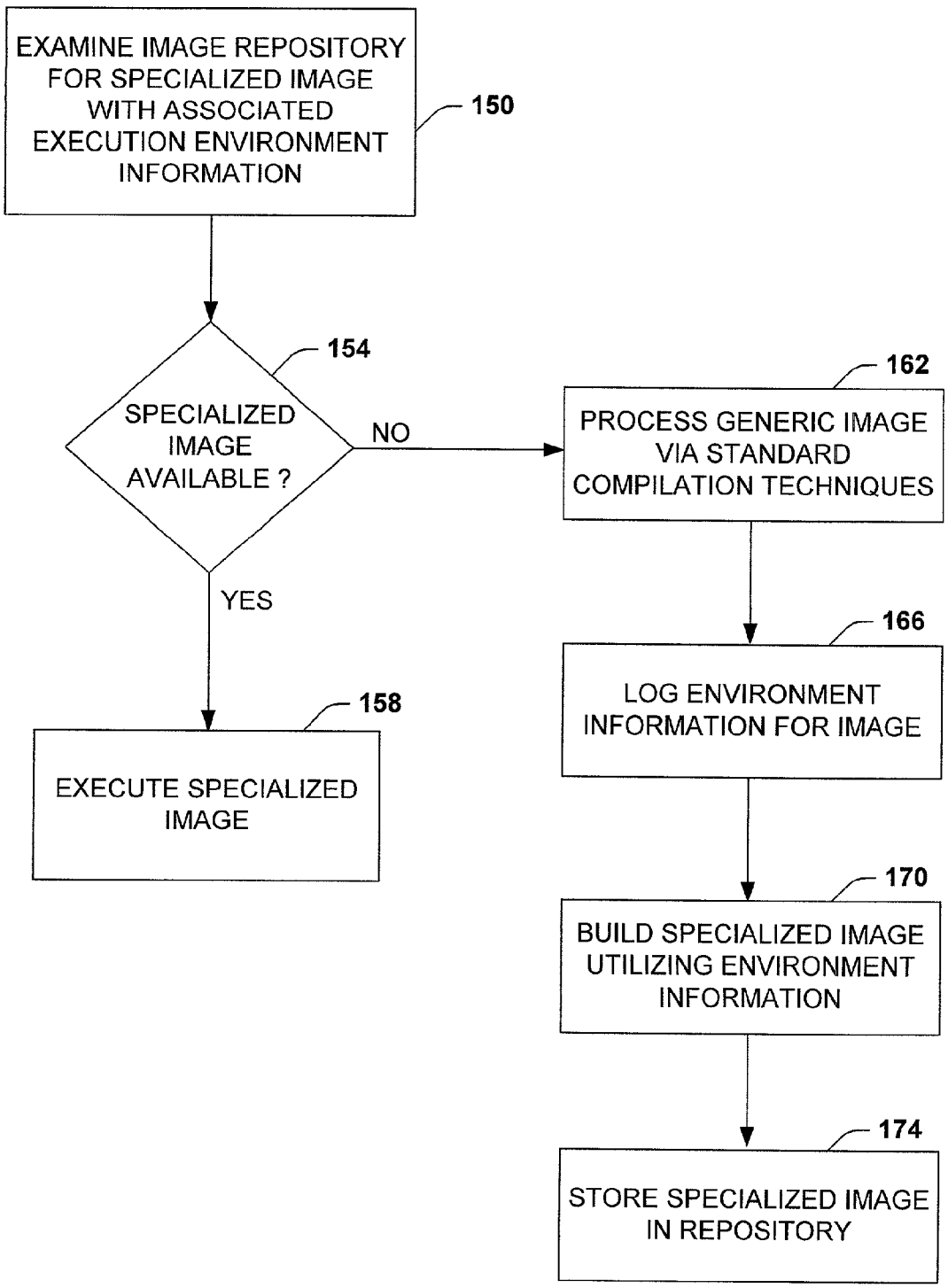
FIG. 7 is a flow chart diagram illustrating a methodology for providing specialized executables in accordance with an aspect of the present invention.

FIG. 7 illustrates a methodology for providing specialized executables in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with an aspect of the present invention.

Referring to FIG. 7, and proceeding to act 150, an image repository is examined for a specialized native image built with associated environmental information. For example, a header field associated with the image may be inspected and compared with current environment settings to determine if a specialized image is available. Proceeding to 154, a determination is made as to whether a specialized image is available. If a specialized image is available at 154, the process proceeds to 158 and executes the specialized image. If a specialized image is not available at 154, the process proceeds to 162. At 162, a generic image is processed into native code according to standard compilation techniques such as Just-In-Time compilation. Proceeding to 166, environment information relating to the processed image at 162 is logged or stored in a database. It is noted that before proceeding to 170, that a policy decision or user interaction (not shown) may be initiated in order to further process the environment information. At 170, a specialized image is built or constructed utilizing the environment information logged at 166. This may include compiling or processing a generic image adjusted or configured with updated execution environment information that has been previously logged. It is also noted that the process depicted at 170, can in general, be arbitrarily delayed from the previous acts. At 174, the specialized image constructed at 170 is stored in a repository, wherein future operations of a virtual system having similar environment settings can utilize the specialized executable.

Figure 8:
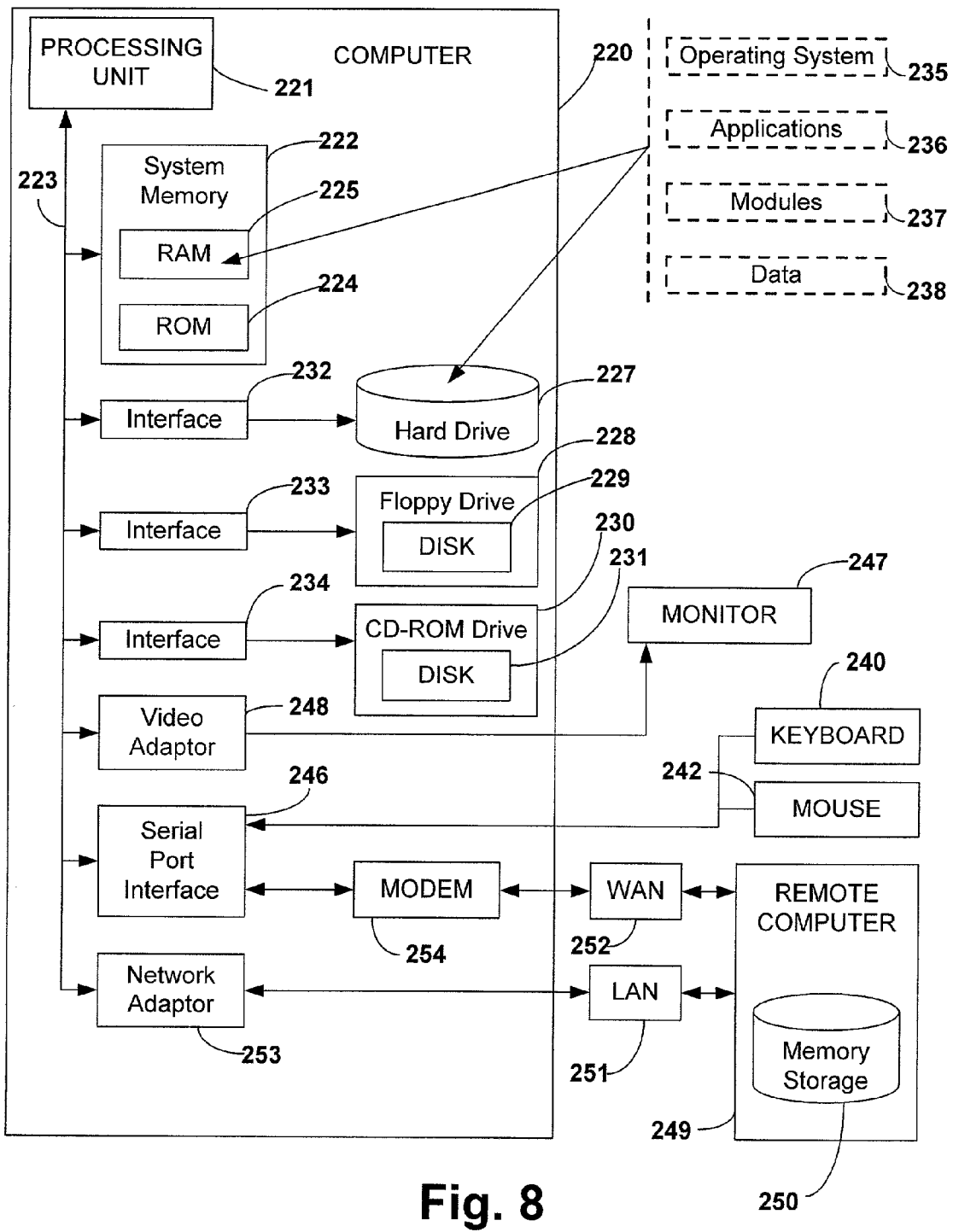
FIG. 8 is a schematic block diagram illustrating a suitable operating environment in accordance with an aspect of the present invention.

In order to provide a context for the various aspects of the invention, FIG. 8 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. It is to be appreciated that dual microprocessors and other multi-processor architectures also may be employed as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. It is noted that the operating system 235 in the illustrated computer may be substantially any suitable operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 8. The logical connections depicted in FIG. 8 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer implemented method for optimizing image execution that balances competing requirements of the higher performance of native compilation and the development time benefits provided by intermediate language systems, comprising the following computer executable acts:
   an execution engine in a virtual execution environment receiving an intermediate language image;
   the execution engine determining an appropriate execution mode for executing the functionality represented by the intermediate language image, the appropriate execution mode selected from among (a) Just-In-Time processing of the intermediate language image within the virtual execution environment and (b) execution of a compiled native code executable on an underlying platform providing the virtual environment, including:
   the execution engine searching a native image repository to determine if the underlying platform is valid for executing any previously compiled native code executable corresponding to the intermediate language image, the native image repository storing previously compiled native code executables for a plurality of different platforms, each previously compiled native code executable stored along with tags indicating environment characteristics for one of the plurality of different platforms for which the native code executable is valid, each native code executable stored in the image repository having been previously specialized from some intermediate language image based on specified environment characteristics for native execution on the one of the plurality of different platforms for which it is valid;
   when the search by the execution engine determines that the underlying platform is not one of the plurality of different platforms for which a previously compiled native code executable is valid:
      the execution engine processing the intermediate language image in accordance with Just-In-Time processing; and
   when the search by the execution engine determines that the underlying platform is one of the plurality of different platforms for which a previously compiled native code executable is valid:
      the execution engine accessing the previously compiled native code executable that is valid for the underlying platform from the native image repository; and
      the execution engine executing the accessed previously compiled native code executable on the underlying platform in lieu of processing the intermediate language image in accordance with Just-In-Time execution.

2. The method of claim 1, further comprising, when the search by the execution engine determines that the underlying platform is not one of the plurality of different platforms for which a previously compiled native code executable is valid, the execution engine logging the intermediate language image along with environment characteristics of the underlying platform into a native image log, the environment characteristics of the underlying platform obtained during processing of the intermediate language image in accordance with the Just-In-Time processing, the native image log providing input to a native image generator that generates native code executables from intermediate language images and corresponding environment characteristics, the native code executables for native execution on corresponding platforms.

3. The method of claim 2, further comprising:
   a native image generator accessing the intermediate language image and the environment characteristics of the underlying platform from the native image log;
   the native image generator compiling a specialized native code executable for native execution on the underlying platform, the specialized native code executable generated from the intermediate language image based on the environment characteristics of the underlying platform; and
   the native image generator storing the compiled specialized native code executable in the native image repository.

4. The method of claim 3, further comprising subsequent to the native image generator storing the specialized native code executable in the native image repository:
   the execution engine again receiving the intermediate language image;
   the execution engine again searching the native image repository to determine if the underlying platform is valid for executing any previously compiled native code executables corresponding to the intermediate language image;

the execution engine determining that the underlying platform is valid for executing the specialized native code executable;

the execution engine accessing the specialized native code executable from the native image repository; and executing the specialized native code executable on the underlying platform in lieu of processing the intermediate language image in accordance with Just-In-Time processing.

5. The method of claim 3, wherein compiling the specialized native code executable comprising processing the intermediate language image utilizing standard compilation techniques.

6. A computer program product for use at a computer system, the computer program product for implementing a method for optimizing image execution that balances competing requirements of the higher performance of native compilation and the development time benefits provided by intermediate language systems, the computer program product comprising one or more computer storage media having stored thereon computer-exactable instructions that, when executed at a processor, cause an execution engine in a virtual execution environment to perform the method, including the following:

receive an intermediate language image;

determine an appropriate execution mode for executing the functionality represented by the intermediate language image, the appropriate execution mode selected from among (a) Just-In-Time processing of the intermediate language image within the virtual execution environment and (b) execution of a compiled native code executable on an underlying platform providing the virtual environment, including:

searching a native image repository to determine if the underlying platform is valid for executing any previously compiled native code executable corresponding to the intermediate language image, the native image repository storing previously compiled code executables for a plurality of different platforms, each previously compiled native code executable stored along with tags indicating environment characteristics for one of the plurality of different platforms for which the native code executable is valid, each native code executable stored in the image repository having been previously specialized from some intermediate language image based on specified environment characteristics for native execution on the one of the plurality of different platforms for which it is valid;

when the search determines the underlying platform is not one of the plurality of different platforms for which a previously compiled native code executed is valid:

processing the intermediate language image in accordance with Just-In-Time processing; and when the search determines that the underlying platform is one of the plurality of different platforms for which a previously compiled native code executable is valid:

accessing the previously compiled native code executable that is valid for the underlying platform from the native image repository; and executing the accessed previously compiled native code executable on the underlying platform in lieu of processing the intermediate language image in accordance with Just-In-Time execution.

7. The computer program product of claim 6, further comprising, when the search by the search engine determines that the underlying platform is not one of the plurality of different platforms for which a previously compiled native code executable is valid, computer executable instructions that, when executed, cause the execution engine to log the intermediate language image along with environment characteristics of the underlying platform into a native image log, the environment characteristics of the underlying platform obtained during processing of the intermediate language image in accordance with the Just-In-Time processing, the native image log providing input to a native image generator that generates native code executables from intermediate language images and corresponding environment characteristics, the native code executables for native execution on corresponding platforms.

8. The computer program product of claim 7, further comprising computer executable instructions that, when executed, cause a native image generator at the computer system to:

access the intermediate language image and the environment characteristics of the underlying platform from the native image log;

compile a specialized native code executable for native execution on the underlying platform, the specialized native code executable generated from the intermediate language image based on the environment characteristics of the underlying platform; and store the compiled specialized native code executable in the native image repository.

9. The computer program product of claim 8, further comprising computer executable instructions that, when executed, cause the execution engine to subsequent to the native image generator storing the specialized native code executable in the native image repository:

receive the intermediate language image again;

search the native image repository again to determine if the underlying platform is valid for executing any previously compiled native code executables corresponding to the intermediate language image;

determine that the specialized native code executable is available for native execution on the underlying platform;

access the specialized native code executable from the native image repository; and execute the specialized native code executable on the underlying platform in lieu of processing the intermediate language image in accordance with Just-In-Time processing.

10. The computer program product of claim 8, wherein computer executable instructions that, when executed, cause the the native image generator to compile the specialized native code executable comprise computer executable instructions that, when executed, cause the computer system to process the intermediate language image utilizing standard compilation techniques.

11. A computer system, the computer system including a platform that provides a virtual environment for executing intermediate language images, the computer system comprising:

a processor;

system memory;

a native image log, the native image log entries for one or more intermediate language images, each entry including image information for an intermediate language image and corresponding environment characteristics of the platform where the intermediate language image was executed, the environment characteristics of the platform obtained during processing of the intermediate language image in accordance with Just-In-Time processing;

a native image repository, the native image repository storing previously compiled native code executables for a plurality of different platforms, each previously compiled native code executable stored along with tags indicating environment characteristics for one of the plurality of different platforms for which the native code executable is valid, each native code executable stored in the image repository having been previously specialized from some intermediate language image based on specified environment characteristics for native execution on the one of the plurality of different platforms for which it is valid;

one or more computer storage media having stored thereon computer-executable instructions representing an execution engine, a native image service, and a native image generator, wherein the execution engine is configured to:

receive an intermediate language image;

determine the appropriate execution mode for executing the functionality represented by the intermediate language image, the appropriate execution mode selected from among (a) Just-In-Time processing of the intermediate language image within the virtual execution environment and (b) execution of a compiled native code executable on the platform, including:

searching the native image repository to determine if the underlying platform is valid for executing any previously compiled native code executable corresponding to the intermediate language image;

when the search determines that the underlying platform is not one of the plurality of different platforms for which a previously compiled native code executable is valid:

process the intermediate language image in accordance with Just-In-Time processing;

obtain environment characteristics of the platform during processing of the intermediate language image in accordance with Just-In-Time processing; and log the image information for the intermediate language image along with environment characteristics of the platform into a native image log;

when the search determines that the underlying platform is one of the plurality of different platforms for which a previously compiled native code executable is valid:

access the previously compiled native code executable from the native image repository; and execute the previously compiled native code executable on the platform in lieu of processing the intermediate language image in accordance with Just-In-Time processing;

wherein the native image service is configured to:

read the image information and environment characteristics for intermediate language images from the native image log; and forward the image information and environment characteristics to the native image generator; and wherein the native image generator is configured to:

receive the image information and environment characteristics from the native image service; and compile a specialized native code executable for native execution on the underlying platform based on the image information and environment characteristics; and store the specialized native code executable in the native image repository.

* * * * *